US010419551B2

(12) United States Patent
Hsueh

(10) Patent No.: US 10,419,551 B2
(45) Date of Patent: Sep. 17, 2019

(54) NETWORK DEVICE AND AUTO DETECTING METHOD FOR DIRECT LINK THEREOF

(71) Applicant: QNAP SYSTEMS, INC., New Taipei (TW)

(72) Inventor: Shih-Chieh Hsueh, New Taipei (TW)

(73) Assignee: QNAP SYSTEMS, INC., New Taipei (TW)

(*) Notice: Subject to any disclaimer, the term of this patent is extended or adjusted under 35 U.S.C. 154(b) by 217 days.

(21) Appl. No.: 15/212,293

(22) Filed: Jul. 18, 2016

(65) Prior Publication Data
US 2017/0346910 A1 Nov. 30, 2017

(30) Foreign Application Priority Data
May 24, 2016 (TW) .............................. 105116046 A

(51) Int. Cl.
H04L 29/08 (2006.01)
H04L 12/26 (2006.01)
H04L 29/06 (2006.01)

(52) U.S. Cl.
CPC .......... *H04L 67/16* (2013.01); *H04L 43/0811* (2013.01); *H04L 65/1066* (2013.01)

(58) Field of Classification Search
CPC .................................................. H04L 43/0811
See application file for complete search history.

(56) References Cited

U.S. PATENT DOCUMENTS

| 6,434,716 | B1 * | 8/2002 | Johnson | G01R 31/31915 370/213 |
| 2004/0240405 | A1 * | 12/2004 | Okazaki | H04W 88/06 370/315 |
| 2005/0078682 | A1 * | 4/2005 | Kim | H04L 12/413 370/395.5 |
| 2006/0041800 | A1 * | 2/2006 | Johnson | G06F 13/1694 714/720 |

(Continued)

FOREIGN PATENT DOCUMENTS

TW 200735575 9/2007

OTHER PUBLICATIONS

"Office Action of Taiwan Counterpart Application," dated Aug. 3, 2017, p. 1-p. 6.

*Primary Examiner* — Jimmy H Tran
(74) *Attorney, Agent, or Firm* — JCIPRNET

(57) ABSTRACT

The disclosure provides a network device and an auto detecting method for automatically detecting direct link between communication devices. In an aspect, the auto detecting method includes following steps. A first network device sends a first signal having a specific pattern from a first network port of the first network device to a second network port of a second network device through a cable network. The first network device determines whether the first network port receives a second signal having the specific pattern from the second network device. When the first network device receives the second signal having the specific pattern from the second network device, the first network device determines that the first network port directly links to the second network port of the second network device; otherwise the first network device determines that the first network device lacks a direct link to the second network device.

12 Claims, 4 Drawing Sheets

(56) References Cited

U.S. PATENT DOCUMENTS

| | | | |
|---|---|---|---|
| 2006/0193292 A1* | 8/2006 | Bansal | H04W 76/14 370/331 |
| 2007/0211628 A1* | 9/2007 | Ikeda | H04L 41/0896 370/230 |
| 2008/0107128 A1* | 5/2008 | Lo | H04L 12/413 370/448 |
| 2008/0120129 A1* | 5/2008 | Seubert | G06Q 10/06 705/35 |
| 2008/0140889 A1* | 6/2008 | Johnson | G06F 13/1694 710/106 |
| 2010/0161768 A1* | 6/2010 | Daniel | H04L 67/1097 709/220 |
| 2011/0019539 A1* | 1/2011 | Suzuki | H04L 49/3009 370/225 |
| 2013/0194917 A1* | 8/2013 | Melsen | H04L 12/287 370/229 |
| 2015/0103676 A1* | 4/2015 | Hsieh | H04L 12/66 370/248 |
| 2015/0222969 A1* | 8/2015 | Urata | H04Q 11/0062 398/48 |
| 2015/0351137 A1* | 12/2015 | Neff | G07C 5/0808 370/329 |
| 2016/0028820 A1* | 1/2016 | Clark | H04L 67/1097 709/219 |

\* cited by examiner

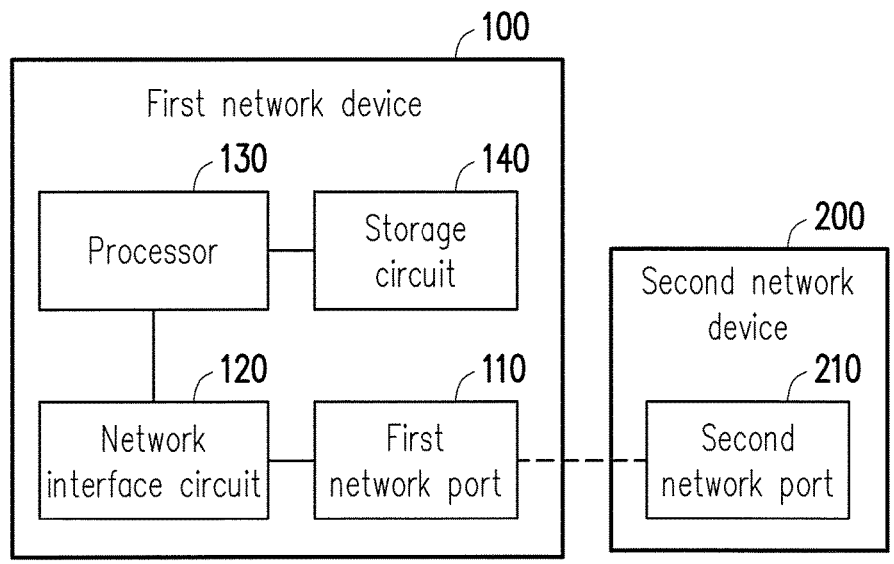

FIG. 1

| The first network device sends a first signal having a specific pattern to a second network port of the second network device, where the first network port of the first network device is connected to the second network port of the second network device in a cable manner | ~S210 |

| The first network device determines whether the first network port receives a second signal having the specific pattern from the second network device | ~S220 |

| When the first network device receives the second signal having the specific pattern from the second network device, the first network device determines that the first network port directly links to the second network device | ~S230 |

FIG. 2

NETWORK DEVICE AND AUTO DETECTING METHOD FOR DIRECT LINK THEREOF

CROSS-REFERENCE TO RELATED APPLICATION

This application claims the priority benefit of Taiwan application serial no. 105116046, filed on May 24, 2016. The entirety of the above-mentioned patent application is hereby incorporated by reference herein and made a part of this specification.

BACKGROUND OF THE INVENTION

Field of the Invention

The invention relates to a detecting technique of network communication, and particularly relates to a network device and an auto detecting method for direct link thereof.

Description of Related Art

In a cable area network, a first network device may directly establish a link with a second network device through a transmission line, so as to implement communication by using a direct link function.

However, even if the first network device and the second network device may communicate with each through the direct link, any of the above devices can only monitor whether a network port of itself is connected to the transmission line, and cannot get to learn the network device located at another end of the transmission line and related information thereof. In order to obtain the information of the second network device directly linked to the first network device, in the existing technique, a user may enter an equipment room placing the network devices to manually search the directly linked network device through a network line. However, since the lines in the equipment room have a large quantity and are mutually interwoven, the above manual search is not applicable in practise. On the other hand, if a program (software or firmware) is respectively installed on the first network device and the second network device to allow the user to operate a user interface provided by the program to detect whether the first network device directly links to the second network device, the first network device has to acquire a login authority of the second network device in advance, so that the direct link is only passively detected, actually.

SUMMARY OF THE INVENTION

The invention is directed to a network device and an auto detecting method for direct link thereof, by which it is actively detected whether a first network device and a second network device are directly linked.

An embodiment of the invention provides an auto detecting method for direct link, which includes following steps. A first network device sends a first signal having a specific pattern to a second network port of a second network device, where a first network port of the first network device is connected to the second network port of the second network device in a cable manner. The first network device determines whether the first network port receives a second signal having the specific pattern from the second network device. When the first network device receives the second signal having the specific pattern from the second network device, the first network device determines that the first network port directly links to the second network device.

An embodiment of the invention provides a first network device. The first network device includes a first network port and a network interface circuit. The network interface circuit is coupled to the first network port, and is configured to send a first signal having a specific pattern to the first network port. The first network device sends the first signal having the specific pattern from the first network port of the first network device to a second network port of a second network device through a cable network. The first network device determines whether the first network port receives a second signal having the specific pattern from the second network port of the second network device. When the first network device receives the second signal having the specific pattern from the second network device, the first network device determines that the first network port directly links to the second network device.

According to the above description, in the first network device and the auto detecting method for direct link thereof of the invention, according to a characteristic that a signal having a specific pattern cannot be transmitted between the first network device and the second network device through a network relay device, when the first signal having the specific pattern sent by the first network device is transmitted to the second network device, and the first network port of the first network device receives the second signal having the specific pattern from the second network device, it is determined that the first network port of the first network device directly links to the second network device. In this way, signal handshake between the first network device and the second network device can be implemented through the specific pattern, so as to implement auto detection of direct link.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a block schematic diagram of a first network device according to an embodiment of the invention.

FIG. 2 is a flowchart illustrating an auto detecting method for direct link according to an embodiment of the invention.

DESCRIPTION OF EMBODIMENTS

Figure 3:
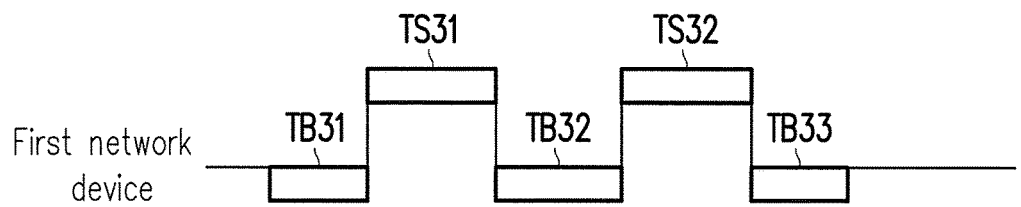
FIG. 3 is an operation timing diagram of the device of FIG. 1 according to an embodiment of the invention.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a block schematic diagram of a first network device according to an embodiment of the invention. The first network device 100 includes a first network port 110 and a network interface circuit 120, and can be complied with different communication specifications according to actual application requirements. The network interface circuit 120 is coupled to the first network port 110. According to different design requirements, the first network port 110 may include a cable network port or a physical data port (for example, an Ethernet port, a RJ45 connector and/or a fiber-optic network port), and the network interface circuit 120 may include a cable network interface circuit (for example, an Ethernet interface circuit, a RJ45 connector interface circuit and/or a fiber-optic network interface circuit) and a photoelectric converter. The network interface circuit 120 may establish a low layer connection with the second network device 200 through a cable network. The low layer connection, for example, includes a physical layer connection. Therefore, signal data belonging to a physical layer can be sent or received by the network interface circuit 120. The first network device 100 and the second network device 200 are, for example, electronic devices having computation capability.

Moreover, the first network device 100 further includes a processor 130 and a storage circuit 140. According to different design requirements, the processor 130 may include a central processing unit (or a central processor), a micro processor, a chipset (for example, a south bridge chip) and/or other computation circuits. Firmware and/or software can be executed in the processor 130. The firmware can be a basic input/output system (BIOS), and the software can be an operating system (OS), a driving program, an application program and/or other software. The processor 130 is coupled to the network interface circuit 120, and is configured to establish a high layer connection with the second network device 200 through the first network port 110 via a network (for example, an Ethernet or other communication network), and may control a whole operation of the first network device. The aforementioned high layer connection, for example, includes a transport layer connection, a network layer connection, etc. To facilitate description, in the following embodiments, the first network device 100 is adopted to describe operations executed by the processor 130. Moreover, the storage circuit 140 can be any type of memory device/circuit, for example, a storage device (for example, a hard disk, a solid state disk, etc.), a memory (for example, a random access memory or other memory circuit/device), a buffer or other data storage medium, which is used for storing the aforementioned firmware, software and/or other data, and is coupled to the processor 130 for being accessed by the processor 130.

Moreover, the second network device 200 may have the same or similar device structure with that of the first network device 100. For example, the second network device 200 may at least include a network port, a network interface circuit, a processor and a storage device, etc. In the embodiment of FIG. 1, only the second network port 220 included in the second network device 200 is illustrated to facilitate description.

FIG. 2 is a flowchart illustrating an auto detecting method for direct link according to an embodiment of the invention, which is adapted to the first network device 100 of FIG. 1. The second network device 200 of FIG. 1 can be deduced by referring to related description of FIG. 2. In step S210, the network interface circuit 120 of the first network device 100 sends a first signal having a specific pattern to a second network port 210 of the second network device 200, where the first network port 110 of the first network device 100 is connected to the second network port 210 of the second network device 200 in a cable manner. For example, the first network port 110 of the first network device 100 and the second network port 210 of the second network device 200 can be connected through a cable area network. In step S220, the first network device 100 determines whether the first network port 110 receives a second signal having the specific pattern from the second network device 200. In step S230, when the first network device 100 receives the second signal having the specific pattern from the second network device 200, the first network device 100 determines that the first network port 110 directly links to the second network device 200.

To be specific, the specific pattern cannot be transmitted to the second network device 200 through a network relay device (for example, a router, a switch, a network hub, etc.). Moreover, the specific pattern is, for example, a signal combination of a physical layer. In some embodiment, the specific pattern may include a switching sequence of a plurality of transmission speeds of the physical layer, for example, a signal combination formed by alternately switching two (or more) transmission speeds in physical transmission speeds of 10000 Mbps, 1000 Mbps, 100 Mbps and 10 Mbps. For example, the network interface circuit 120 of the first network device 100 may switch a physical layer transmission speed, and the switching sequence thereof is 100 Mbps, 10 Mbps, 100 Mbps, 10 Mbps, . . . , and the switching sequence of the above transmission speeds is taken as the first signal of the first network port 110 of the first network device 100. In another embodiment, the specific pattern may include a switching sequence of connection states of the physical layer, for example, a signal combination formed by alternation switch of connection (a voltage level on a network line is pulled up) and disconnection (the voltage level on the network line is pulled down). For example, the network interface circuit 120 of the first network device 100 may switch the physical layer connection states, and a switching sequence thereof is "connected", "not connected", "connected", "not connected, "connected", . . . , and the switching sequence of the above connection states is taken as the first signal of the first network port 110 of the first network device. As the physical layer is used for defining transmission of an original bit stream between adjacent nodes in the network, only when the first network port 110 of the first network device 100 directly links to the second network device 200, the specific pattern can be directly sent to the second network device 200, and if the first network port 110 of the first network device 100 is connected to the second network device 200 through a network relay device (for example, a router, a switch, a network hub, etc.), the specific pattern can only be sent to the network relay device, and cannot be transmitted to the second network device 200 though the network relay device. Based on the above conception, when the physical layer signal having the specific pattern can be effectively transmitted between the first network device 100 and the second network device 200, it can be determined that the first network device 100 directly links to the second network device 200.

In some embodiments, the first network device 100, for example, sets a detecting period according to a random number algorithm, and detects the second signal having the specific pattern and coming from the second network device 200 during the detecting period. After the detecting period is ended, the first network device 100 sends the first signal having the specific pattern to the second network port 210 of the second network device 200 through the first network port 110.

For example, FIG. 3 is an operation timing diagram of the device of FIG. 1 according to an embodiment of the invention. When it is determined that the first network port 110 has been connected to the network line, the first network device 100 can be triggered to start executing an auto detecting procedure for direct link. To be specific, first, the first network device 100 may operate during a detecting period TB31, and detects the second signal having the specific pattern and coming from the second network device 200 during the detecting period TB31. A time length of the detecting period TB31 can be randomly determined by the first network device 100 according to the random number algorithm. When the detecting period TB31 is ended, the first network device 100 is switched to operate in a signal transmitting period TS31, and sends the first signal having the specific pattern to the first network port 110 of the first network device 100 during the signal transmitting period TS31, so as to transmit the first signal having the specific pattern to another end of the network line through the network line connected to the first network port 110. When the signal transmitting period TS31 is ended, the first network device 100 is again switched to operate in a detecting period TB32, and is sequentially switched to operate in a signal transmitting period TS32 and a detecting period TB33, etc., according to the aforementioned method. The aforementioned detecting periods TB32, TB33 can be determined according to the random number algorithm. According to another aspect, the first network device 100 may alternately operate in at least one detecting period and at least one signal transmitting period.

In some applications, the first network device 100 may receive the second signal having the specific pattern from the second network device 200 during the first detecting period (for example, the detecting period TB31 shown in FIG. 3). In some other applications, the first network device 100 may receive the second signal having the specific pattern from the second network device 200 during the later detecting periods (for example, the detecting periods TB32, TB33 shown in FIG. 3). In order to effectively detect the direct link between the devices, the first network device 100 may accumulate times of detection (which is referred to as accumulated detection times) according to the operated detecting periods, and by setting a threshold to the accumulated detection times, it is determined whether to repeatedly execute the step of detecting whether the first network port 110 receives the second signal having the specific pattern from the second network device 200.

For example, in the embodiment of FIG. 3, the threshold is set to 3. When the first network device 100 operates till the end of the detecting period TB33, and the first network port 110 does not receive the second signal having the specific pattern from the second network device 200, since the accumulated detection times is 3 (corresponding to the operated detecting periods TB31, TB32 and TB33), the first network device 100 may determine that the first network port 110 is not directly linked to the second network device 200, and ends the detecting procedure for direct link.

Figure 4:
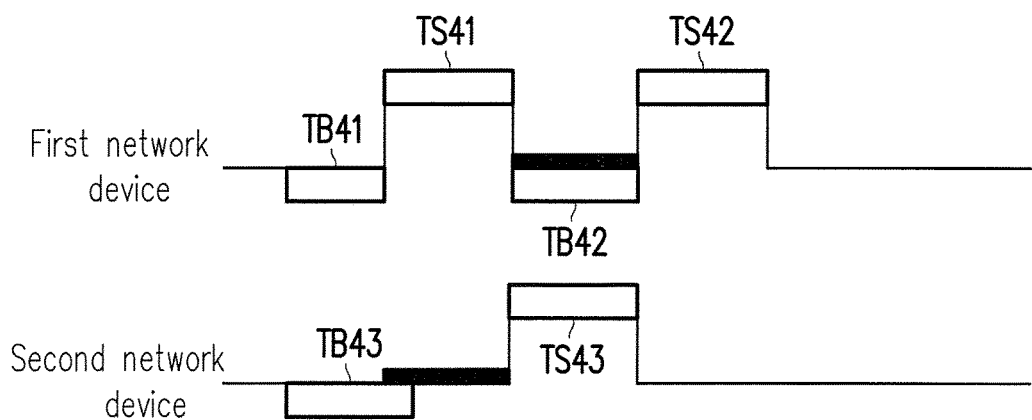
FIG. 4 is an operation timing diagram of the devices of FIG. 1 according to another embodiment of the invention.

For another example, FIG. 4 is an operation timing diagram of the devices of FIG. 1 according to another embodiment of the invention, in which a situation that the first network port 110 of the first network device 100 directly links to the second network device 200 is described in detail. When it is determined that the first network port 110 has been connected to the network line, the first network device 100 can be triggered to start executing the auto detecting procedure for direct link. Similar to the embodiment of FIG. 3, the first network device 100 may alternately operate in the detecting periods (for example, detecting periods TB41 and TB42) and the signal transmitting periods (for example, signal transmitting periods TS41 and TS42). Moreover, the second network device 200 can also be triggered to start executing the auto detecting procedure for direct link after determining that the second network port 210 thereof is connected to the network line. The second network device 200 may also alternately operate in the detecting period (for example, a detecting period TB43) and the signal transmitting period (for example, a signal transmitting period TS43), and an operation method thereof is similar to that of the first network device 100. It should be noted that in the present embodiment, since the time length of each of the detecting period is determined according to a random number, regarding the time lengths, the detecting period TS41 of the first network device 100 can be different to the detecting period TS43 of the second network device 200, and the detecting period TS42 of the first network device 100 can be different to the aforementioned detecting periods TS41 and TS43.

As shown in FIG. 4, in the present embodiment, the detecting period TB41 is, for example, smaller than the detecting period TB43. Since the detecting period TB41 is covered by the detecting period TB43, the first network device 100 does not detect that the first network port 110 receives the second signal having the specific pattern from the second network device 200 during the detecting period TB41. When the detecting period TB41 is ended, the first network port 110 of the first network device 100 sends the first signal having the specific pattern, and now the first network device 100 enters the signal transmitting period TS41. Since the second network device 200 still operates in the detecting period TB43, the second network device 200 may detect the first signal having the specific pattern sent by the first network device. Then, the second network device 200, for example, waits for ending of the signal transmitting period TS41 of the first network device 100 (in the operation timing diagram of the second network device 200, a bold line portion indicates the signal transmitting period TS41 of the first network device 100). Then, the second network device 200 enters the signal transmitting period TS43, and sends the second signal having the specific pattern to the first network port 110 of the first network device 100. On the other hand, the first network device 100 enters the detecting period TB42, and detects the second signal having the specific pattern sent by the second network device 200 during the detecting period TB42 (in the operation timing diagram of the first network device 100, a bold line portion indicates the signal transmitting period TS43 of the second network device 200). In this way, it is determined that the first network port 110 directly links to the second network device 200.

Figure 5:
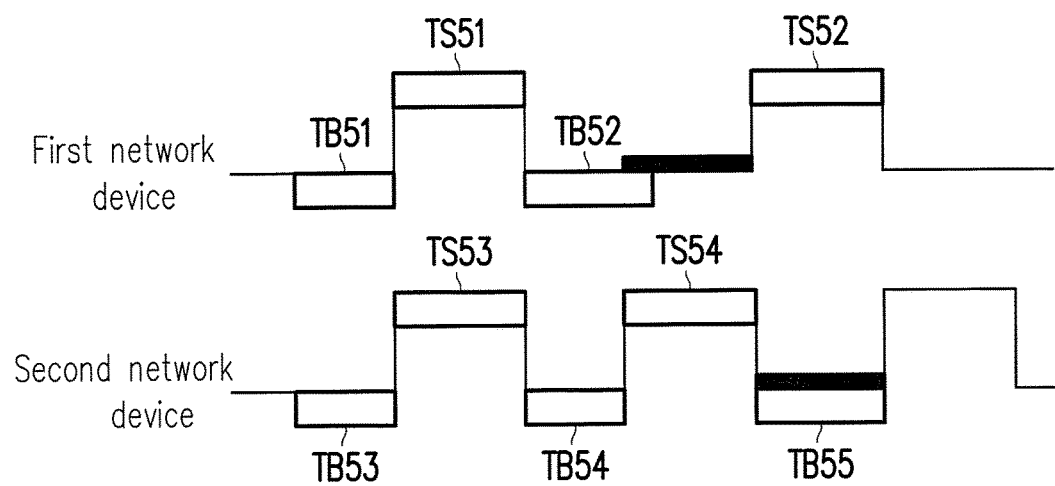
FIG. 5 is an operation timing diagram of the devices of FIG. 1 according to another embodiment of the invention.

In some applications, the aforementioned detecting periods TB41 and TB43 probably have a same time length and are mutually overlapped on a time axis. Therefore, the first network device 100 determines that the first network port 110 directly links to the second network device 200 in the subsequent detecting period. For example, FIG. 5 is an operation timing diagram of the devices of FIG. 1 according to another embodiment of the invention, in which another situation that the first network port 110 of the first network device 100 directly links to the second network device 200 is described in detail. Regarding a detecting period TB51 of the first network device 100 and a detecting period TB53 of the second network device 200, the detecting period TB51 and the detecting period TB53 have a same time length and are mutually overlapped on the time axis. Moreover, regarding a signal transmitting period TS51 of the first network device 100 and a signal transmitting period TS53 of the second network device 200, the signal transmitting period TS51 and the signal transmitting period TS53 have a same time length and are also overlapped on the time axis. In other words, in the present embodiment, the first network device 100 does not detect that the first network port 110 receives the second signal having the specific pattern from the second network device 200 during the detecting period TB51, and the second network device 200 does not detect the first signal having the specific pattern sent by the first network device 100 during the detecting period TB53.

Then, a detecting period TB52 determined by a random number is, for example, greater than a detecting period TB54. Therefore, when the detecting period TB54 is ended, the second network device 200 may enter a signal transmitting period TS54, and may send the second signal having the specific pattern to the first network port 110 of the first network device 100. Now, since the first network device 100 still operates in the detecting period TB52, the first network device 100 may detect the second signal having the specific pattern sent by the second network device 200. Then, the first network device 100, for example, waits or ending of the signal transmitting period TS54 of the second network device 200 (in the operation timing diagram of the first network device 100, a bold line portion indicates the signal transmitting period TS54 of the second network device 200). Then, the first network device 100 enters a signal transmitting period TS52, and sends the first signal having the specific pattern through the first network port 110. On the other hand, the second network device 200 enters a detecting period TB55, and receives the first signal having the specific pattern sent by the first network device 100 during the detecting period TB55 (in the operation timing diagram of the second network device 200, a bold line portion indicates the signal transmitting period TS52 of the first network device 100). In this way, it is determined that the first network port 110 directly links to the second network device 200.

Figure 6:
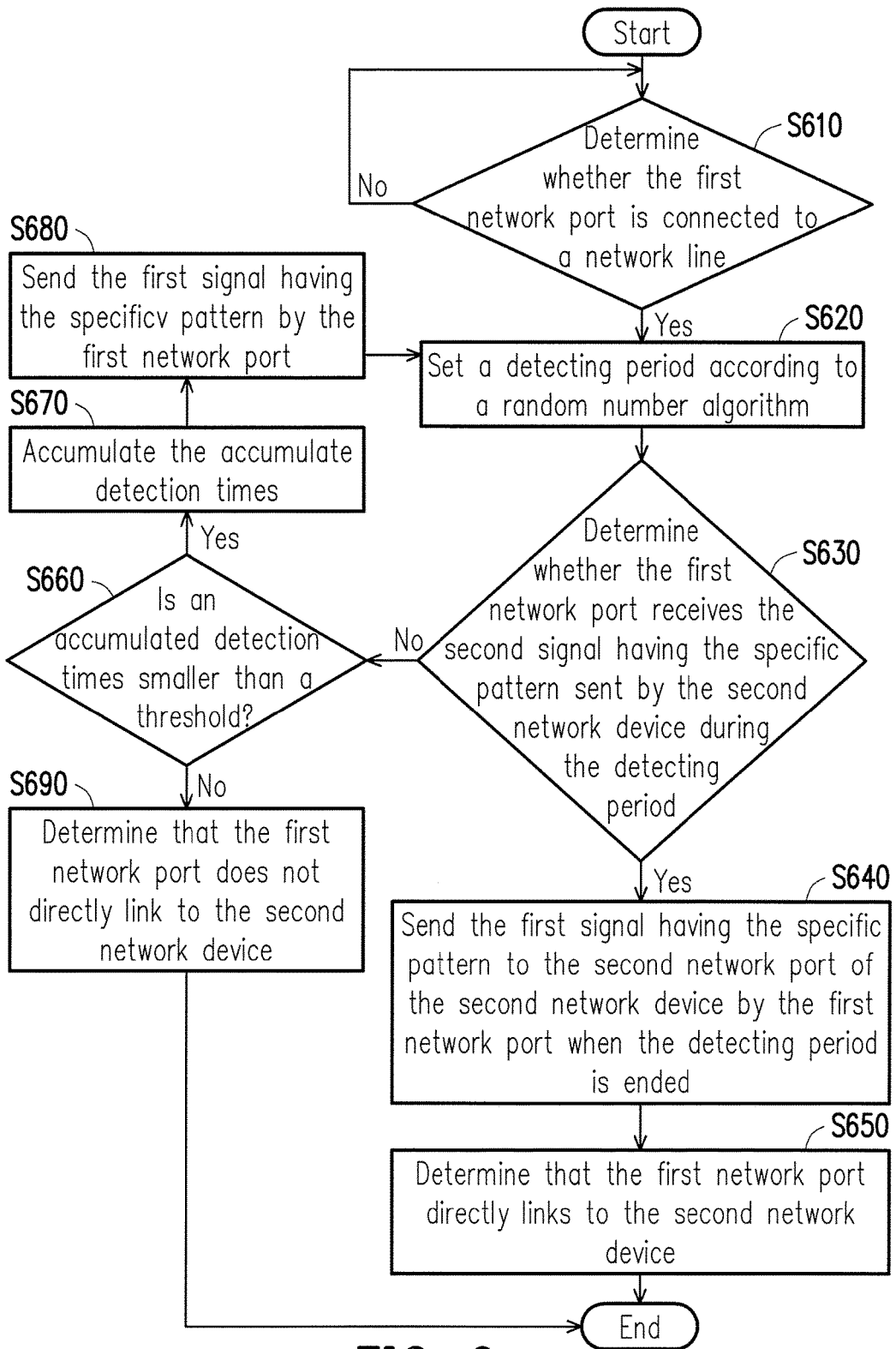
FIG. 6 is a flowchart illustrating an auto detecting method for direct link according to another embodiment of the invention.

According to the above description, FIG. 6 is a flowchart illustrating an auto detecting method for direct link according to another embodiment of the invention, which is adapted to the first network device 100 of FIG. 1. In step S610, the first network device 100 determines whether the first network port 110 is connected to a network line. The first network device 100, for example, executes the determination operation of the step S610 when the first network device 100 is booted or receives an input operation of a user. When it is determined that the first network port 110 is connected to the network line, in step S620, the first network device 100 sets a detecting period according to a random number algorithm. On the other hand, if it is determined that the first network port 110 is not connected to the network line, the first network device 100 may continually monitor a connection state of the first network port 110 through an application (for example, NetWatchdog) having a monitoring function, and repeats the step S610.

In step S630, the first network device 100 determines whether the first network port 110 receives the second signal having the specific pattern sent by the second network device 200 during the detecting period. If yes, a step S640 is executed, by which when the detecting period is ended, the first network port 110 of the first network device 100 sends the first signal having the specific pattern to the second network port 210 of the second network device 200. Since the second network device 200 also receives the first signal having the specific pattern sent by the first network device 100, a step S650 is executed, by which the first network device 100 determines that the first network port 110 directly links to the second network device 200, and then the flow of FIG. 6 is ended.

On the other hand, after the detecting period is ended, if the first network port 110 of the first network device 100 does not receive the second signal having the specific pattern sent by the second network device 200, a step S660 is executed, by which the first network device 100 determines whether an accumulated detection times is smaller than a threshold. When the accumulated detection times is smaller than the threshold, a step S670 is executed, by which the first network device 100 accumulates the accumulated detection times, and in step S680, the first network port 110 of the first network device 100 sends the first signal having the specific pattern, and the flow returns to the steps S620 and S630 to reset a detecting period according to the random number algorithm, so as to re-execute the step of determining whether the first network port 110 receives the second signal having the specific pattern sent by the second network port 210 of the second network device 200 during the reset detecting period.

In brief, if a first detecting period and a second detecting period are adopted to represent two adjacent detecting periods during which the first network device 100 sequentially operates, the first network device 100 may execute the step of determining whether the first network port 110 receives the second signal having the specific pattern sent by the second network device 200 during the first detecting period, and after the first detecting period is ended, if the first network port 110 of the first network device 100 does not receive the second signal having the specific pattern sent by the second network port 210 of the second network device 200, the first network device 100 determines whether the accumulated detection times is smaller than the threshold, and when the accumulated detection times is smaller than the threshold, the first network device 100 accumulates the accumulated detection times, and re-execute the step of determining whether the first network port 110 receives the second signal having the specific pattern sent by the second network port 210 of the second network device 200 during the second detecting period.

Moreover, when it is determined that the accumulated detection times is not smaller than the threshold, in step S690, the first network device 100 determines that the first network port 110 does not directly link to the second network device 200, and the flow of FIG. 6 is ended.

In summary, in the embodiments of the invention, by using the first network device and the second network device to send the first and the second signals having the specific pattern to each other, an effect similar to signal handshake is achieved. Moreover, according to a characteristic that a signal having a specific pattern of a physical layer cannot be transmitted between the first network device and the second network device through a network relay device, when the specific pattern is transmitted from the first network port of the first network device to the second network device, and the first network device receives the second signal having the specific pattern from the second network device through the first network port, it is determined that the first network port of the first network device directly links to the second network device. In this way, the auto detection of direct link can be implemented, and detection convenience is effectively improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An auto detecting method for direct link, comprising:
    sending, by a first network device, a first signal having a specific pattern which comprises a switching sequence of a plurality of transmission speeds of a physical layer to a second network port of a second network device, wherein a first network port of the first network device is connected to the second network port of the second network device in a cable manner;
    determining, by the first network device, whether the first network port receives a second signal having the specific pattern from the second network device;
    determining, by the first network device, that the first network device directly links to the second network device when the first network device receives the second signal having the specific pattern from the second network device;
    determining, by the first network device, that the first network device does not directly links to the second network device when the first network device does not receive the second signal having the specific pattern from the second network device; and
    setting a time length of a detecting period by the first network device according to a random number algorithm, so as to detect the second signal having the specific pattern sent by the second network device during the detecting period.

2. The auto detecting method for direct link as claimed in claim 1, wherein the specific pattern is a combination of signals of a physical layer.

3. The auto detecting method for direct link as claimed in claim 1, wherein the specific pattern comprises a switching sequence of connection states of a physical layer.

4. The auto detecting method for direct link as claimed in claim 1, further comprising:
    sending the first signal having the specific pattern to the second network port of the second network device by the first network device through the first network port when the detecting period is ended.

5. The auto detecting method for direct link as claimed in claim 1, further comprising:
    executing the step of determining whether the first network port receives the second signal having the specific pattern from the second network device during a first detecting period;
    determining whether an accumulated detection times is smaller than a threshold when the first detecting period is ended and the first network port of the first network device does not receive the second signal having the specific pattern sent by the second network port of the second network device; and
    accumulating the accumulated detection times by the first network device, and re-executing the step of determining whether the first network port receives the second signal having the specific pattern sent by the second network port of the second network device during a second detecting period when the accumulated detection times is smaller than the threshold.

6. The auto detecting method for direct link as claimed in claim 1, wherein the first network port or the second network port comprises a physical data port such as an Ethernet port or a fiber-optic network port.

7. A first network device, comprising:
    a first network port; and
    a network interface circuit, coupled to the first network port, and configured to send a first signal having a specific pattern which comprises a switching sequence of a plurality of transmission speeds of a physical layer to the first network port, wherein the first network device sends out the first signal having the specific pattern from the first network port of the first network device to a second network port of a second network device through a cable network, the first network device determines whether the first network port receives a second signal having the specific pattern from the second network port of the second network device, when the first network device receives the second signal having the specific pattern from the second network device, the first network device determines that the first network port directly links to the second network device, when the first network device does not receive the second signal having the specific pattern from the second network device, the first network device determines that the first network device does not directly links to the second network device, and the first network device sets a time length of a detecting period according to a random number algorithm, so as to detect the second signal having the specific pattern sent by the second network device during the detecting period.

8. The first network device as claimed in claim 7, wherein the specific pattern is a combination of signals of a physical layer.

9. The first network device as claimed in claim 7, wherein the specific pattern comprises a switching sequence of a plurality of transmission speeds of a physical layer.

10. The first network device as claimed in claim 7, wherein when the detecting period is ended, the first network port of the first network device sends the first signal having the specific pattern to the second network port of the second network device.

11. The first network device as claimed in claim 7, wherein the first network device determines whether the first network port receives the second signal having the specific pattern from the second network port of the second network device during a first detecting period; when the first detecting period is ended and the first network device does not receive the second signal having the specific pattern from the second network device, the first network device determines whether an accumulated detection times is smaller than a threshold; and when the accumulated detection times is smaller than the threshold, the first network device accumulates the accumulated detection times, and re-determines whether the first network port receives the second signal having the specific pattern sent by the second network port of the second network device.

12. The first network device as claimed in claim 7, wherein the first network port comprises a physical data port such as an Ethernet port or a fiber-optic network port.

* * * * *